Figure 1:
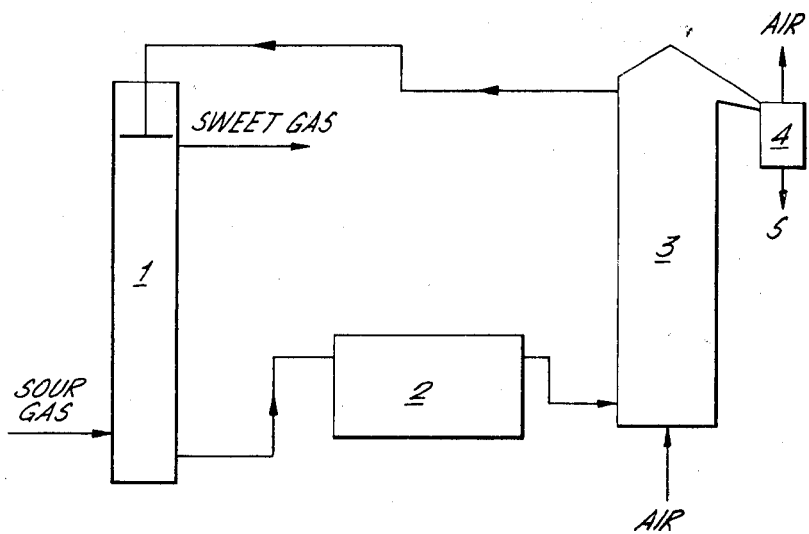

United States Patent [19]

Nicklin et al.

[11] 4,049,776

[45] Sept. 20, 1977

[54] METHOD OF REMOVING HYDROGEN SULFIDE FROM GASES AND LIQUIDS

[75] Inventors: Thomas Nicklin, Bamford; Dorothy Hughes, Manchester, both of England

[73] Assignee: British Gas Corporation, London, England

[21] Appl. No.: 606,545

[22] Filed: Aug. 21, 1975

[30] Foreign Application Priority Data

Aug. 27, 1974 United Kingdom .............. 37418/74

[51] Int. Cl.² ............................................. B01D 53/34
[52] U.S. Cl. ............................... 423/226; 423/573 G; 210/59
[58] Field of Search ............... 423/224, 226, 571, 573, 423/573 L; 210/59

[56] References Cited

U.S. PATENT DOCUMENTS 3,937,795  2/1976  Hasebe ................................. 423/226

FOREIGN PATENT DOCUMENTS 948,270  1/1964  United Kingdom ................. 423/226

*Primary Examiner*—Earl C. Thomas
*Attorney, Agent, or Firm*—Larson, Taylor and Hinds

[57] ABSTRACT

The activity of the metal components of Stretford Redox Liquors can be maintained in the presence of complexing groups present in the organic redox agent by preparing the organic quinone component under acidic conditions in the presence of ferrous or ferric ions. The iron complexed quinone may be added to the metallic components under conditions to maintain the alkaninity of the mixed Liquor.

6 Claims, 2 Drawing Figures

METHOD OF REMOVING HYDROGEN SULFIDE FROM GASES AND LIQUIDS

This invention relates to a process whereby hydrogen sulphide can be effectively removed from gases or non polar liquids. Several processes exist which act to remove hydrogen sulphide from various gases and liquids, most of which involve the reduction of the sulphide to elemental sulphur. One such process is known as the Stretford Process and is described in our U.K. Patent Specification No. 948,270.

In our British Patent Specification No. 948,270, there is disclosed a redox process for the removal of hydrogen sulphide from gas streams by washing with an alkaline solution of a compound of a metal having at least two stable valency stages e.g. a metal vanadate, and the sodium salt of one or more of the isomers of anthraquinone disulphonic acid (hereinafter referred to as ADA). The hydrogen sulphide reacts initially with the aqueous alkaline wash liquor in which it has become dissolved to produce hydrogen ions and hydrosulphide ions according to the reaction below:

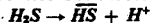

The hydrosulphide ions so formed react with five valent vanadium as follows:

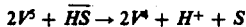

Thus sulphur is deposited and four valent vanadium produced. Other multi valent metal systems which may be used either in addition to or as an alternative to vanadium are also disclosed in our prior U.K. Pat. No. 948,270. Iron is described as an example of such multi valent metal.

The reduced form of vanadium is difficult to oxidize by direct air blowing and the presence of an oxidation catalyst is necessary: ADA more than adequately fills his role as below.

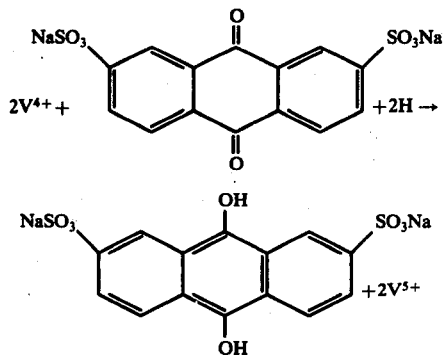

The reduced form of ADA so produced can easiy be reoxidized by air blowing thereby completing the cycle. It has furthermore been found that other quinonoid structures have a measure of activity in this capacity of oxidation catalyst as described in a co-pending application Ser. No. 599,858, filed July 28, 1975, now abandoned. The subject matter of this application is included herein by reference.

It is often the case that quinonoid compounds of the type described above, and in particular, ADA isomers contain significant amounts of impurities comprising sulphonated, hydroxylated and poly hydroxy sulphonated derivatives. Furthermore these compounds could additionally be di, tri, or even quadri, substituted with sulphonic acid groups. We have found that compounds of this type have been found to be particularly effective chelating agents for metal ions. It has been found that the presence of these sulphonated hydroxyl compounds inhibits the reoxidation of Stretford Process liquors and that the mechanism whereby this inhibiting effect takes place is via the previously mentioned capability to chelate metal ion species, by this means a proportion of the vanadium in solution is chelated and effectively prohibited from entering the Stretford Process redox reactions or at best the activity of such chelated vanadium is seriously inhibited.

The chelating capacity of any chelating agent depends not only on the capabilities and properties of the agent itself, but also on the physical and chemical properties of the metal ion species that is chelated. It has been found in the course of investigation that iron ions are very strongly chelated by organic sulphonated hydroxy compounds of the type hereinbefore described so much so that they replace vanadium thereby liberating this specie for its intended purpose, namely the oxidation of hydrogen sulphide.

In accordance with the present invention there is provided a process for the removal of hydrogen sulphide from gases or non polar liquids, which process comprises contacting said gas or liquid with an aqueous alkaline liquor comprising a quinone and a compound of a metal having at least two valency states, which liquor is prepared according to the steps:

i. adding ferrous or ferric ions to an aqueous solution of a quinone, at a pH of less than 7 to form a ferric ion sulphonated and/or hydroxy quinone complex and thereafter ii. adding said ferric ion sulphonated and/or quinone complex to an alkaline solution of said compound of a metal having at least two valency states, whereby the pH of the admixture is above pH 7.

It has been found for instance that an amount of ferric ion equivalent to 1.5% of the pure ADA expressed on a weight basis is adequate to reinstate the full activity of a vanadium — ADA system contaminated with up to 5% of sulphonated hydroxy quinone derivatives.

In the normal course of events ADA would be added to Stretford solutions by straight forward addition to the alkaline wash liquor where the pH of such wash liquor would desirably fall within the range of 8.5 to 9.0. In these conditions free ferric or ferrous ion could only be present in very small quantities as could be readily predicted and calculated from the solubility product of the respective hydroxides.

In order that the contaminated substituents be rendered inactive, a ferric ion sulphonated hydroxl ADA complex is formed in a separate vessel at pH below 7 and preferably below 5. If this mixture is then added to the alkaline main body of solution iron hydroxide does not now precipitate.

The amount of iron added to the quinone solution will depend upon the nature and magnitude of the contaminent substituent groups and can be readily determined by routine experiment upon analysis of the purity of the quinone to be used for producing the Stretford Liquor.

Anthraquinones, such as are described in U.K. Pat. No. 871,233 and U.S. Pat. No. 2,997,439, are suitable for the purposes of this invention. The substitution of hydroxyl groups and sulpho groups in other positions on the nucleus may be regarded for the purpose of this invention, as contamination.

Quinones, other than sulphonated anthraquinones, which may also be used in accordance with the process of the present invention include quinone derivatives haveing the general formula:

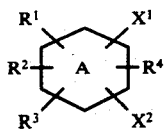

wherein A is an aryl or quinoid nucleus $X^1$ and $X^2$ are both hydroxyl groups when A is an aryl group, or $X^1$ and $X^2$ are both oxygen atoms when A is a quinoid nucleus, $R^1$, $R^2$, $R^3$ $R^4$ are each hydrogen atoms or solubilising groups with the priviso that when A is an anthracyl or anthraquinoyl group not more than one of the groups $R^1$, $R^2$, $R^3$ and $R^4$ is a sulpho group. When A is a naphthaquinoyl group there is preferably present at least one solubilising group at one or more of the 2, 3, 5, 6, 7 and 8 positions. Examples of solubilising groups for the positions $R^1$ through $R^4$ include sulpho ($SO_3$), hydroxy (OH), nitro ($NO_2$) and nitroso (ONO) groups. The nucleus A may be a phenyl, naphthyl or anthraquinyl group.

Examples of compounds having the above general formula include hydroquinone, p-benzoquinone and bonded quinhydrones of the structure:

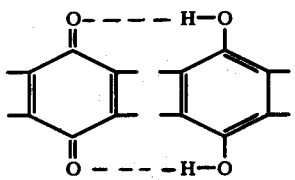

water soluble naphthaquinones such as 1,4-naphthanquinone-2-sulphonic acid and 1,2-napthaquinone-4-sulphonic acid and mono-sulpho substituted anthraquinones such as 1-sulpho-6-nitro-anthraquinone, 1-sulpho-7-nitro-anthraquinone and the corresponding 1-sulpho 6/7 hydroxy analogues.

The aqueous quinone solution may contain from 2 to 4 gms per liter of solution of any of the quinone derivatives, and may be initially made alkaline by adding ammonia or other base such as an alkali carbonate. The alkaline solution has a pH above 7, the preferred value being from 8.5 to 9.5.

The compound of a metal having at least two valency states may be an ortho-, meta-, or pyrovanadate of ammonia or of an alkali metal, e.g. sodium ammonium vanadate or sodium orthovanadate. Whichever salt is initially added, it would appear that a metavanadate is formed in a solution having a pH or about 9. It is preferably added in such quantity as to give a solution of concentration M/1000 to M/10, although concentrations outside this range may be used. The final pH of the liquor may be adjusted and/or buffered to above pH 7, preferably from pH 8.5 to pH 9.5 by adding ammonia or other base such as an alkali carbonate, optionally in admixture with a bicarbonate.

Other metal compounds which may be used are salts of iron or cobalt, for example ferrous sulphate or ferric chloride. Such salts may likewise be used in concentrations of M/1000 to M/100.

Good results are obtainable also by using vanadates together with salts or metal such as iron.

It will be seen that where iron is used alone or in admixture with vanadium, that it plays a different role than the iron initially used to complex the contaminent substituents on the quinone nucleus. The iron-containing solutions of the present invention are novel since the iron was added under acidic conditions whereas the multi valent metal used for the redox reaction, and including iron alone, is added under alkaline conditions.

Where vanadates are used, it is preferable to add a chelating or sequestering agent, such as sodium potassium tartrate or other soluble tartrate acid or ethylene diamine tetraacetic acid or sodium citrate in sufficient quantity to complex a portion of the vanadate, in order to maintain the solubility of the vanadate in the presence of hydrosulphide.

Accordingly this invention provides an important process for the removal of hydrogen sulphide from gas streams whereby the activity or the organic acid carrier can be considerably enhanced. All enhanced activity is manifest as a decrease in the time taken to re-oxide all units forming the Stretford solution.

The invention will be illustrated by reference to the following example.

This example illustrates the effect of adding iron under acidic conditions upon the time taken to attain maximum oxidation, which is a function of the activity of the quinone vanadate redox system.

A Stretford Liquor was prepared by first making an M/80 aqueous solution of a commercial anthraquinone disulphonic acid. The active components were 2:6 and 2:7 ADA. To this liquor was added 50ppm of iron.

The iron ADA complex solution was then added to an aqueous liquor consisting of

| | | |
|---|---|---|
| 25 gm/l | — | $NaHCO_3$ |
| 5 gm/l | — | $Na_2CO_3$ |
| M/32 | — | Sodium metavanadate |
| M/75 | — | Sodium potassium tartrate |

The mixed liquor was a Stretford Liquor in accordance with the invention.

The liquor was circulated in a Stretford Plant schematically represented in FIG. 1 of the accompanying drawings wherein

| | | |
|---|---|---|
| 1 | — | Scrubbing Tower |
| 2 | — | Reaction Tank |
| 3 | — | Oxidiser Tower |
| 4 | — | Sulphur Froth Catch |

A sour gas comprising carbon dioxide, nitrogen and hydrogen sulphide to give a sulphur loading of 500 ppm was contacted counter-currently with the Stretford Liquor in the scrubbing tower 1. The sulphur laden liquor is then passed to a reaction tank 2, to allow completion of the oxidation of the hydrogen sulphide (as solvated HS ion) to elemental sulphur, with concommitant reduction of the vanadium and ADA X components. The sulphur laden reduced liquor is then passed to the oxidiser tower 4 where an oxygen containing gas, in this case air, is blown in. The vanadium and ADA components are re-oxidised, the elemental sulphur is stripped by the physical action of the air, from the liquor and removed into catch vessel 4. The re-oxidised liquor is passed back to the scrubbing tower 1 for re-use.

Although the plant is designed to work continuously, for the purpose of this example the flow was interrupted so that liquor flow in the oxidiser was static. During the re-oxidation stage, samples of liquor were taken at predetermined periods and analysed to determine the degree of oxidation.

The experiment was repeated using a similar Stretford Liquor but to which no iron was added during the preparation stage.

Figure 2:
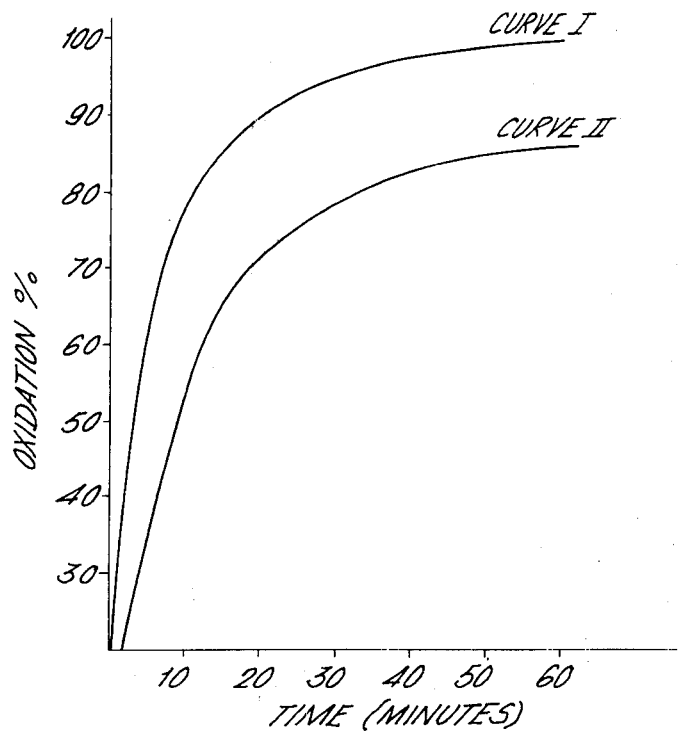

The results are shown in FIG. 2 of the accompanying drawing which is a graph in which % oxidation is plotted against time. Curve I is the oxidation curve of the process according to the invention and curve II is the oxidation curve of a Stretford Liquor to which no iron was added.

It will be seen that substantially complete re-oxidation and hence activity can be achieved in accordance with the practice of the process of this invention whereas only about 80% activity is restored using prior methods.

We claim:

1. In a process for the removal of hydrogen sulphide from gases or non-polar liquids by contacting said gas or liquid with an aqueous alkaline liquor comprising a quinone and a compound of a metal having at least two valency states, and in which said liquor contains an impurity selected from the group consisting of sulfonated, hydroxy, and hydroxy sulfonated derivatives of said quinone, the improvement wherein said aqueous alkaline liquor is prepared by adding ferrous or ferric ions to an aqueous solution of said quinone, at a pH of less than 7, to form a complex with said impurity, said complex being selected from ferric ion sulphonated quinones, ferric ion hydroxy quinones and ferric ion sulphonated hydroxy quinones and thereafter adding the acid solution of said complex to an aqueous solution of said compound of a metal having at least two valency states, whereby to form said aqueous alkaline liquor, and whereby said liquor has a pH above pH 7.

2. A process as claimed in claim 1 wherein the quinone derivative is selected from group consisting of
   Anthraquinone Disulphonic acids
   hydroquinone
   p-henzoquinone
   hydrogen bonded quinhydrones
   1,4-naphthaquinone-2-sulphonic acids salts
   1,2-naphthaquinone-4-sulphonic acid salts
   6-nitro-anthracene-9,10-dione-1-sulphonic acid salts
   7-nitro-anthracene-9,10,-dione-1-sulphonic acid salts
   6-hydroxy-anthracene-9,10-dione-1-sulphonic acid salts
   7-hydroxy-anthracene-9,10-dione-1-sulphonic acid salts.

3. A process as claimed in claim 1 wherein the pH of the aqueous liquor is from 8.5 to 9.5.

4. A process as claimed in claim 1 wherein the aqueous solution contains an ortho-, meta-, or pyrovanadate of ammonia or an alkaline metal.

5. A process as claimed in claim 1 wherein the aqueous solution contains from 2 to 4 gms/liter of solution of said quinone derivative and said metal compound in a quantity to give a solution concentration of from M/1000 to M/10.

6. A process as claimed in claim 1 in which said metal is selected from the group consisting of vanadium, cobalt, and iron.

* * * * *